(12) United States Patent
Leemhuis et al.

(10) Patent No.: US 12,104,707 B1
(45) Date of Patent: Oct. 1, 2024

(54) HIGH PRESSURE AXIAL FLOW CHECK VALVE

(71) Applicant: US Valve Corporation, Wilmington, NC (US)

(72) Inventors: Shaun Kevin Leemhuis, Wilmngton, NC (US); Samuel David Anderson, Wilmington, NC (US)

(73) Assignee: US VALVE CORPORATION, Wilmington, NC (US)

( * ) Notice: Subject to any disclaimer, the term of this patent is extended or adjusted under 35 U.S.C. 154(b) by 0 days.

(21) Appl. No.: 18/131,887

(22) Filed: Apr. 7, 2023

(51) Int. Cl.
*F16K 15/06* (2006.01)

(52) U.S. Cl.
CPC .................................. *F16K 15/063* (2013.01)

(58) Field of Classification Search
CPC ...... F16K 1/427; F16K 15/025; F16K 15/063; F16K 2200/502
See application file for complete search history.

(56) References Cited

U.S. PATENT DOCUMENTS

| | | | |
|---|---|---|---|
| 712,929 A * | 11/1902 | Hedstrom | F16K 15/03 |
| | | | 137/454.2 |
| 3,937,250 A * | 2/1976 | Golan | F16K 15/025 |
| | | | 251/297 |
| 4,667,697 A | 5/1987 | Crawford | |
| 6,866,062 B2 * | 3/2005 | Lammers | F16K 15/063 |
| | | | 137/542 |
| 7,094,020 B2 | 8/2006 | Dong et al. | |
| 8,091,592 B2 | 1/2012 | Sato | |
| 9,038,664 B2 * | 5/2015 | McCarty | F16K 1/42 |
| | | | 137/625.37 |
| 9,688,446 B2 | 6/2017 | Nakamura | |
| 10,197,175 B2 | 2/2019 | Kennedy | |
| 10,295,067 B2 | 5/2019 | Williams | |
| 10,562,062 B2 | 2/2020 | Dobizi et al. | |
| 11,073,218 B2 | 7/2021 | Tomasko et al. | |
| 2007/0193633 A1 * | 8/2007 | Howell | F16K 15/063 |
| | | | 137/542 |

* cited by examiner

*Primary Examiner* — Kevin F Murphy
(74) *Attorney, Agent, or Firm* — GALGANO IP LAW-PLLC; Thomas M. Galgano (57) ABSTRACT

A high pressure axial flow check valve includes a check valve body and a guide that has two outer tabs that are able to be positioned underneath two overhanging lips of the valve body. The guide is to first be inserted into the valve body until seated, after which the guide is able to be rotated 90° until the screw holes in the guide are aligned with the holes in the valve body. Once properly aligned, a plurality of guide screws are used to fasten the guide to the valve body. Once the guide screws are fastened to the valve body, the guide screws will then be able to be protected from an internal fluid flow path by two retainers placed on top of the guide and secured by a plurality of retainer screws. The retainer screws, once secured, will not be subjected to the same fluid flow pressures or mechanical reaction forces caused by check valve operation as the guide screws, the latter of which are of greatest concern if loosened and/or dislodged as this would disrupt and/or prevent the smooth, continuous and long-term operation of the check valve.

18 Claims, 12 Drawing Sheets

HIGH PRESSURE AXIAL FLOW CHECK VALVE

BACKGROUND OF THE INVENTION

Technical Field of the Invention

The present invention relates, generally, to a high pressure axial flow check valve for preventing reverse fluid flow.

More particularly, the present invention relates to a high pressure axial flow check valve for preventing a reverse fluid flow which includes guide screws that are protected from the mechanical reaction forces caused by the check valve operation, and shielded from the internal fluid flow path, thereby creating an axial check valve that minimizes, if not eliminates, the possibility of a "blowout" of the check valve. This is in contrast to standard axial flow check valves that utilize a bolted, threaded, or flanged connection.

Description of the Prior Art

Check valves are commonly used in applications to protect pumps and compressors from reverse fluid flow. The check valve allows flow in the intended direction, but when the fluid flow slows down or starts to reverse, the valve automatically shuts or closes to prevent the reverse flow. Check valves are essential to the safe operation of application critical equipment.

Axial-flow check valves are valves that have a disc or poppet that moves axially in line with the direction of the fluid flow path. An axial check valve is used in many types of applications, but is generally recommended for high oscillation applications, where minimal pressure loss is critical. The short stroke length of the disc helps prevent damage from high cycling, and the hydrodynamic geometry of the valve internals promotes a reduced pressure loss across the valve. Due to the nature of axial flow check valves, and specifically of high oscillation applications of axial flow check valves, the transmittal of forces from the disc to both the seating surface in the valve body when the valve reaches a fully-closed position and the surface impacted when the disc reaches a fully-open position must be considered. These forces are referred to as mechanical reaction forces caused by check valve operation.

Axial-flow check valves known to the state of the art generally consist of a valve body, guide (or diffuser), seat, and disc (or poppet) that is actuated by a compression spring. For these internal parts to be installed in the check valve, at least one side of the check valve must have a removable component. The most common structure for axial check valves consists of a guide component that is integral with the cast body and a removable seat and retainer. For this type of valve construction, the retainer either consists of a bolted connection to the valve body or, as an alternative construction, the retainer has external male threads and is threaded into the female threads in the valve body.

For a ring type joint flange connection, which is conventionally used in high pressure or high temperature applications, the flange is connected via a metal ring that is compressed between the face of the flange and the face of the valve body. In this installation, the faces do not make contact, in that any screws located inside the ring joint area will be located inside of the flow path and therefore subjected to internal pressure. This internal pressure and the mechanical reaction forces caused by check valve operation will act to push the removable component of the axial flow check valve outwards and would result in stresses acting on the retaining components, thereby producing an increased risk of expensive and dangerous system failures.

The prior art known to the inventor includes Crawford, U.S. Pat. No. 4,667,697, issued May 26, 1987, which discloses a unitized check valve that includes a valve disk that is coaxially associated with a seat and is adapted for axial movement to block and unblock an aperture in order to control the flow of fluid through a line. Crawford further teaches the alignment of two sets of flanges and rotation of a retainer for causing the two sets of flanges to be engaged for preventing axial displacement of the retainer, but fails to teach how stresses on bolts or screws between the body of the check valve and the removable seat and retainer can be minimized for reducing the risk of failure due to high pressure fluid flows.

Dobizl et al., U.S. Pat. No. 10,562,062, issued Feb. 18, 2020, discloses a retainer for a check valve, in which there is rotation of an inner valve member relative to the outer valve member in an opening direction thereby causing operating tabs to rotate from their respective alignment slots (135) and into their respective circumferential channels.

Additional prior art pertaining to check valves known to the inventor includes Dong et al., U.S. Pat. No. 7,094,020, issued Aug. 22, 2006; Sato, U.S. Pat. No. 8,091,592, issued Jan. 10, 2012; Nakamura, U.S. Pat. No. 9,688,446, issued Jun. 27, 2017; Kennedy, 10,197,175, issued Feb. 5, 2019; Williams, U.S. Pat. No. 10,295,067, issued May 21, 2019; and Tomasko et al., U.S. Pat. No. 11,073,218, issued Jul. 27, 2021.

A high pressure axial check valve that significantly reduces stresses on bolts or screws between the body of the check valve and the removable guide, seat, or retainers for minimizing the risk of failure due to high pressure fluid flows is thus absent from the prior art.

SUMMARY OF THE INVENTION

It is therefore an object of the present invention to provide a high pressure axial flow check valve that significantly reduces or eliminates stresses on bolts or screws between the body of the check valve and the removable guide, seat, or retainers, protecting them from the high pressure fluid flows, thus minimizing the risk of failure.

It is yet an additional object of the present invention to provide a high pressure axial flow check valve which minimizes, if not eliminates the risk of failure due to a loosening of the bolts or screws as a result of high pressure fluid flow and mechanical reaction forces caused by check valve operation.

The foregoing and related objects are accomplished by the high pressure axial flow check valve of the present invention, which includes a check valve body and a guide that has two outer tabs that are able to be positioned underneath two overhanging lips of the valve body. The guide is to first be inserted into the valve body until seated, after which the guide is able to be rotated 90° until the screw holes in the guide are aligned with the holes in the valve body. Once properly aligned, a plurality of guide screws (the number of screws preferably matching the number of aligned screw holes) are used to fasten the guide to the valve body.

Once the guide screws are fastened to the valve body, the guide screws will then be able to be protected from an internal fluid flow path by two retainers placed on top of the guide and secured by a plurality of retainer screws. The retainer screws, once secured, will not be subjected to the same fluid flow pressures and mechanical reaction forces caused by check valve operation as the guide screws; the latter of which are of greatest concern if loosened and/or dislodged as this would disrupt and/or prevent the smooth, continuous, and long-term operation of the check valve.

The guide is held in place by the valve body itself, and the plurality of guide screws, once the guide is rotated 90°, is not subjected to the internal fluid flow pressure or the full extent of mechanical reaction forces caused by check valve operation, effectively creating a high pressure axial flow check valve having a substantially minimized risk of a blowout, if not otherwise being blowout proof, which would not otherwise be possible with conventional bolted, threaded, or flanged, connections for axial flow check valves.

More particularly, the mechanical improvement of the high pressure axial flow check valve is achieved by allowing the guide to rotate into place in a position located underneath an overhanging lip of the valve body. This arrangement prevents the internal pressure and the mechanical reaction forces caused by check valve operation from acting on the guide in a manner that would cause the guide or any of the plurality of guide screws retaining the guide to fail and be sent down line into the piping and/or process equipment the high pressure axial check valve is acting to protect. Each overhanging lip of the valve body that interfaces with the guide will absorb any energy transmitted to the overhanging lip (or overhanging lips), thereby permitting the guide and its plurality of guide screws to be retained in the fastened position.

Preferably, there are four, five or six guide screws used, however any number of guide screws may be used that sufficiently secure the guide to the valve body.

Preferably, there are six retainer screws with three screws for each of two retainers, however the number of retainer screws can readily be varied, such as having four retainers or eight retainers, as may be sufficient for the optimal practice of the present invention.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the present invention and are not intended as a means for defining the limits and scope of the invention.

BRIEF DESCRIPTION OF THE DRAWING FIGURES

In the drawing figures, wherein similar features are denoted with similar reference numerals throughout the several views.

DETAILED DESCRIPTION OF THE DRAWING FIGURES AND PREFERRED EMBODIMENTS

Figure 1:
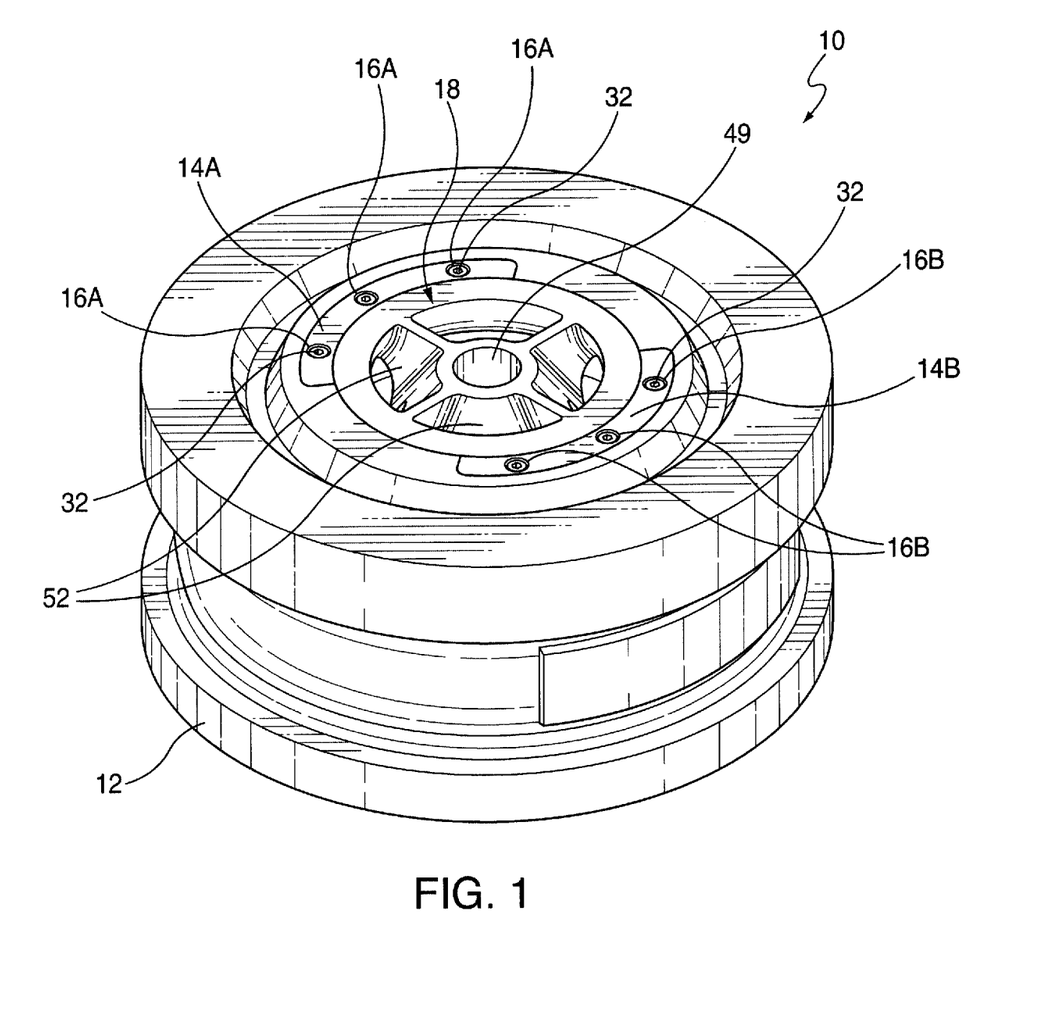
FIG. 1 is a perspective view of the high pressure axial flow check valve of the present invention.

Turning now, in detail, to the accompanying drawing figures, FIG. 1 is a perspective view of the high pressure axial flow check valve 10 of the present invention, which is shown as including a generally cylindrical valve body 12 and two generally arcuate, oppositely opposed retainers 14A, 14B each preferably having three (3) spaced apart retaining screw sockets 16A, 16B in each of which a retaining screw 32 is threadably received. The preferred embodiment of the high pressure axial flow check valve is shown as being a wafer style check valve.

Figure 2:
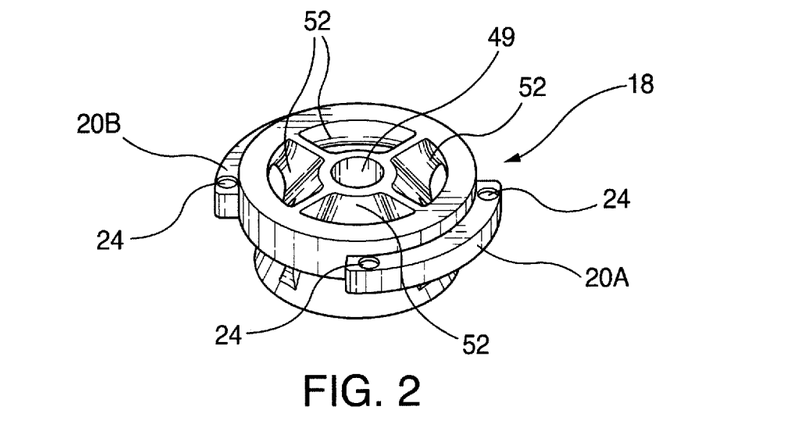
FIG. 2 is perspective view of the guide of the high pressure axial flow check valve of the present invention having two outer tabs.
Figure 3:
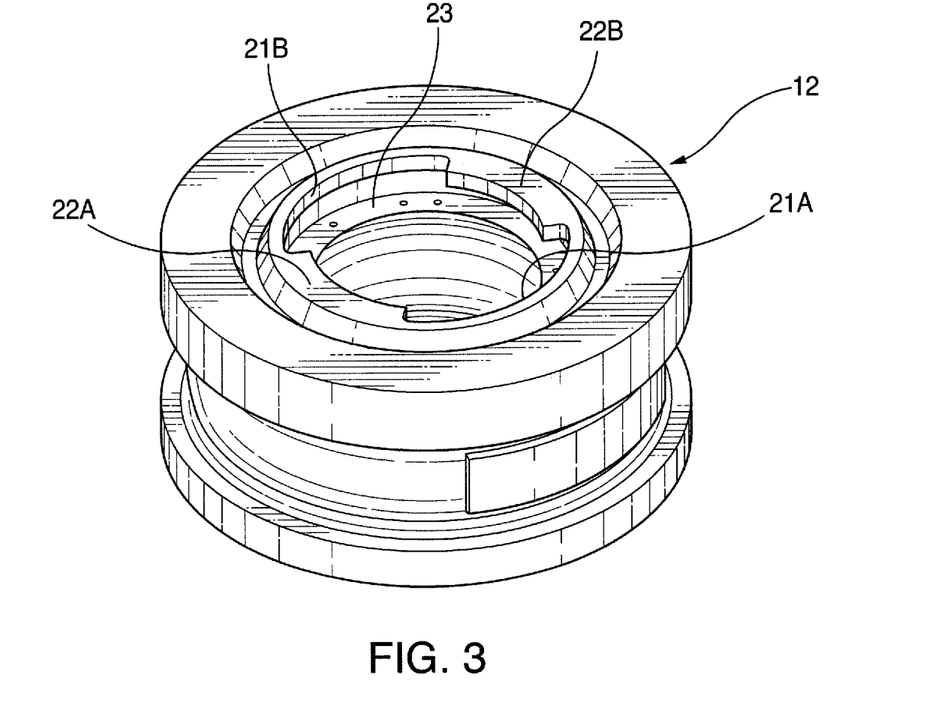
FIG. 3 is a perspective view of valve body of the high pressure axial flow check valve of the present invention having two overhanging lips.
Figure 4:
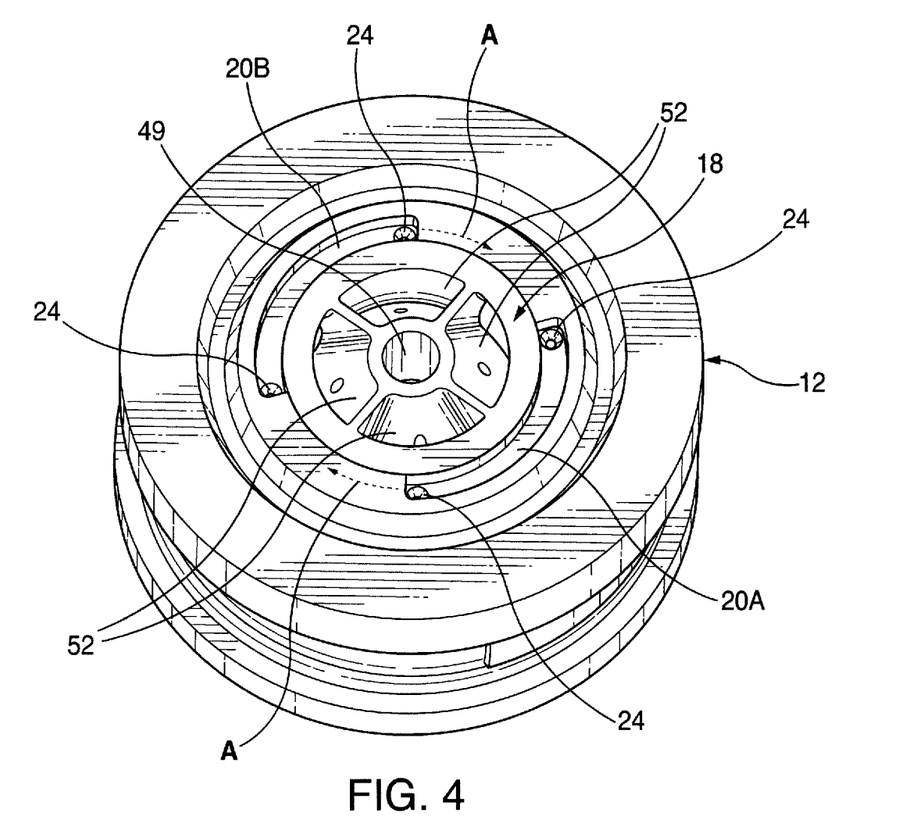
FIG. 4 is a perspective view of the check valve of the present invention showing the guide of the high pressure axial flow check valve inserted into the valve body of the present invention.
Figure 5:
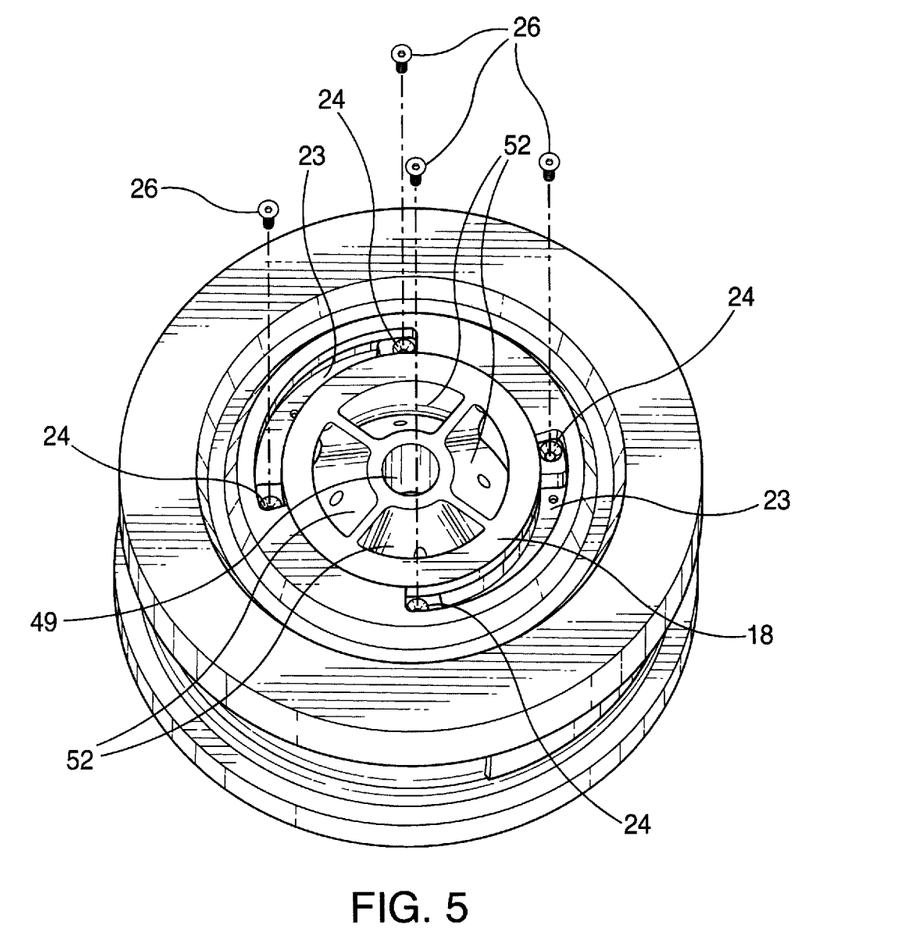
FIG. 5 is a partially-exploded, perspective view of the check valve of the present invention showing the guide of the high pressure axial flow check valve installed in the valve body of the present invention, as shown in FIG. 4, now rotated into final position with a plurality of guide screws prior to installation thereof.
Figure 6:
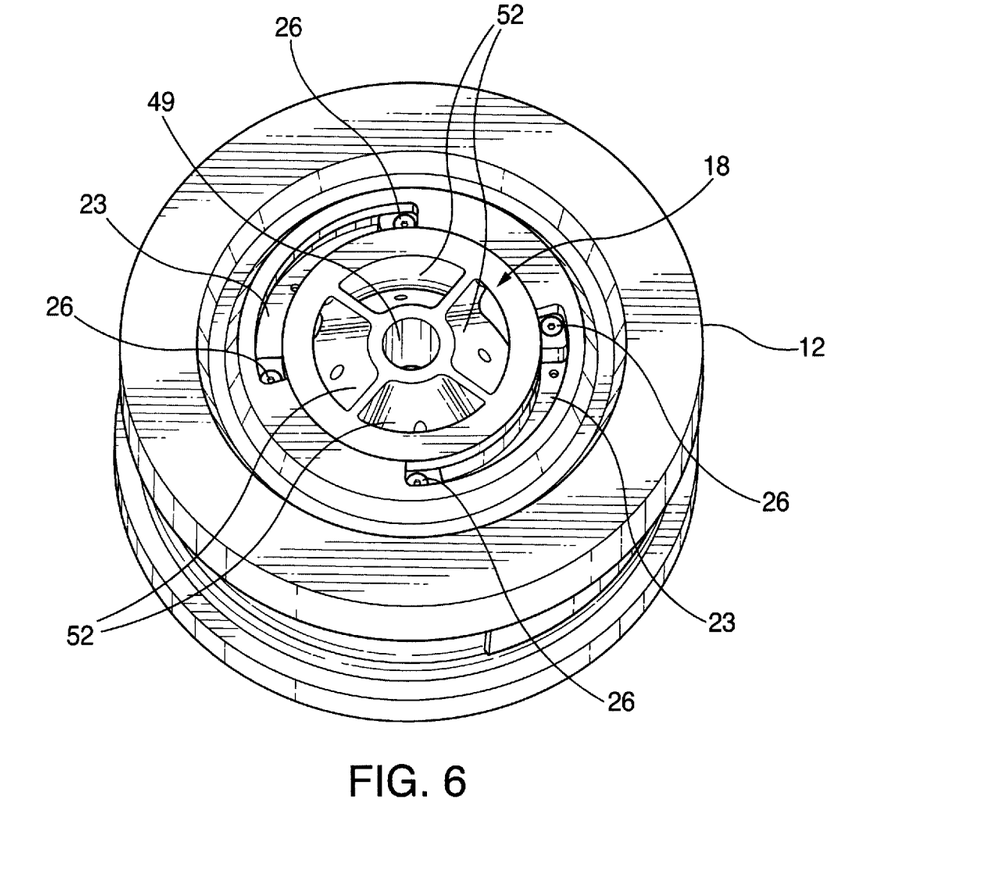
FIG. 6 is a perspective view of the check valve of the present invention showing the guide of the high pressure axial flow check valve installed in the valve body of the present invention, as shown in FIG. 5, with the plurality of guide screws installed and fastened for securing the guide to the valve body.

FIG. 2 is perspective view of the generally cylindrical guide 18 of the high pressure axial flow check valve 10 of the present invention having two generally arcuate, oppositely-opposed outer tabs 20A, 20B. More particularly, guide 18 includes outer tabs 20A, 20B, which upon 90° pivotal rotation of guide 18 about its central, longitudinal axis will position and align themselves underneath two overhanging lips 22A, 22B of valve body 12, as illustrated in FIG. 3. Guide 18 is to first be inserted into valve body 12 with its outer tabs 20A, 20B aligned with the corresponding arcuate cut-outs 21A, 21B of valve body 12 as shown in FIG. 3. Then, guide 18 is lowered into valve body 12 until outer tabs 20A, 20B are fully seated and rest upon a circular or annular shelf 23 of valve body 12, as shown in FIG. 4. Guide 18 is then rotated 90° in the direction of arrows A until guide screw holes 24 are lined up with holes therebelow (not visible) in valve body 12, as shown in FIG. 5. Guide screws 26 are inserted into the preferably two, spaced-apart guide screw holes 24 in each of the outer arcuate tabs 20A, 20B, as shown in FIGS. 5 and 6.

Figure 7:
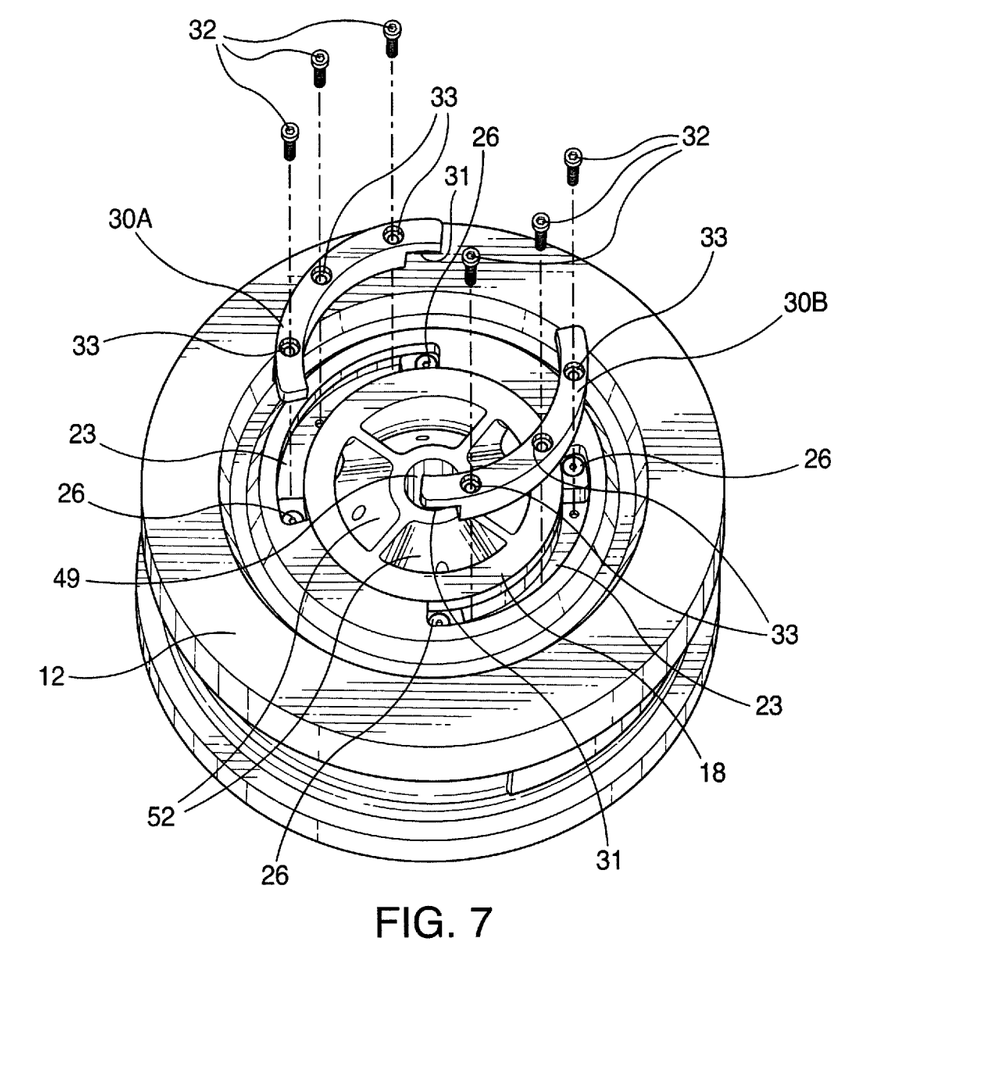
FIG. 7 is a partially-exploded perspective view of the check valve of the present invention showing two retainers of the high pressure axial flow check valve of the present invention with retainer screws prior to installation for securing the retainers to the valve body.
Figure 8:
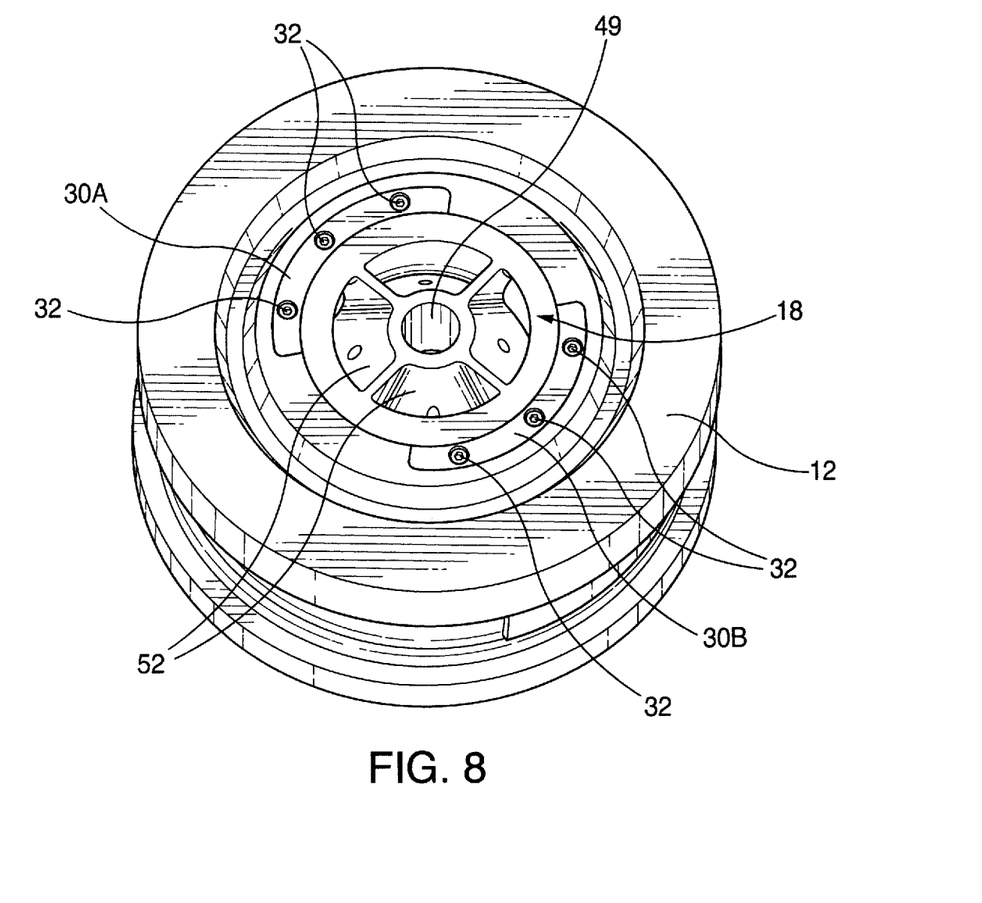
FIG. 8 is a perspective view of the check valve of the present invention showing the two retainers of the high pressure axial flow check of the present invention with the retainer screws of FIG. 7 after installation for securing the retainers to the valve body.

The improvement of the high pressure axial check valve 10 of the present invention is that guide screws 26 following installation, as explained above, will be protected from the full extent of the mechanical reaction forces caused by check valve operation by a plurality of overhanging lips 22A, 22B on the valve body, as well as shielded from the internal fluid flow by retainers, preferably two generally arcuate retainers 30A, 30B, shown in FIG. 7, placed thereover, each preferably having a set of three (3) spaced-apart screw holes 33. Consequently, guide screws 26 will then be covered by the underside of retainers 30A, 30B and thus isolated or protected from the internal flow path by retainers 30A, 30B placed on top of outer tabs 20A, 20B of guide 18 and with the ends of retainers 30A, 30B extending over the guide screws 26 on opposite sides of guide 18, as illustrated in FIGS. 7 and 8. Retainers 30A, 30B are secured in place via retainer screws 32 over the guide 18 and guide screws 26. The retainer screws 32 will not be subjected to the same mechanical reaction forces caused by check valve operation that the guide screws 26 otherwise would endure, so the placement of the retainer screws 32 in the flow path is acceptable.

Figure 10:
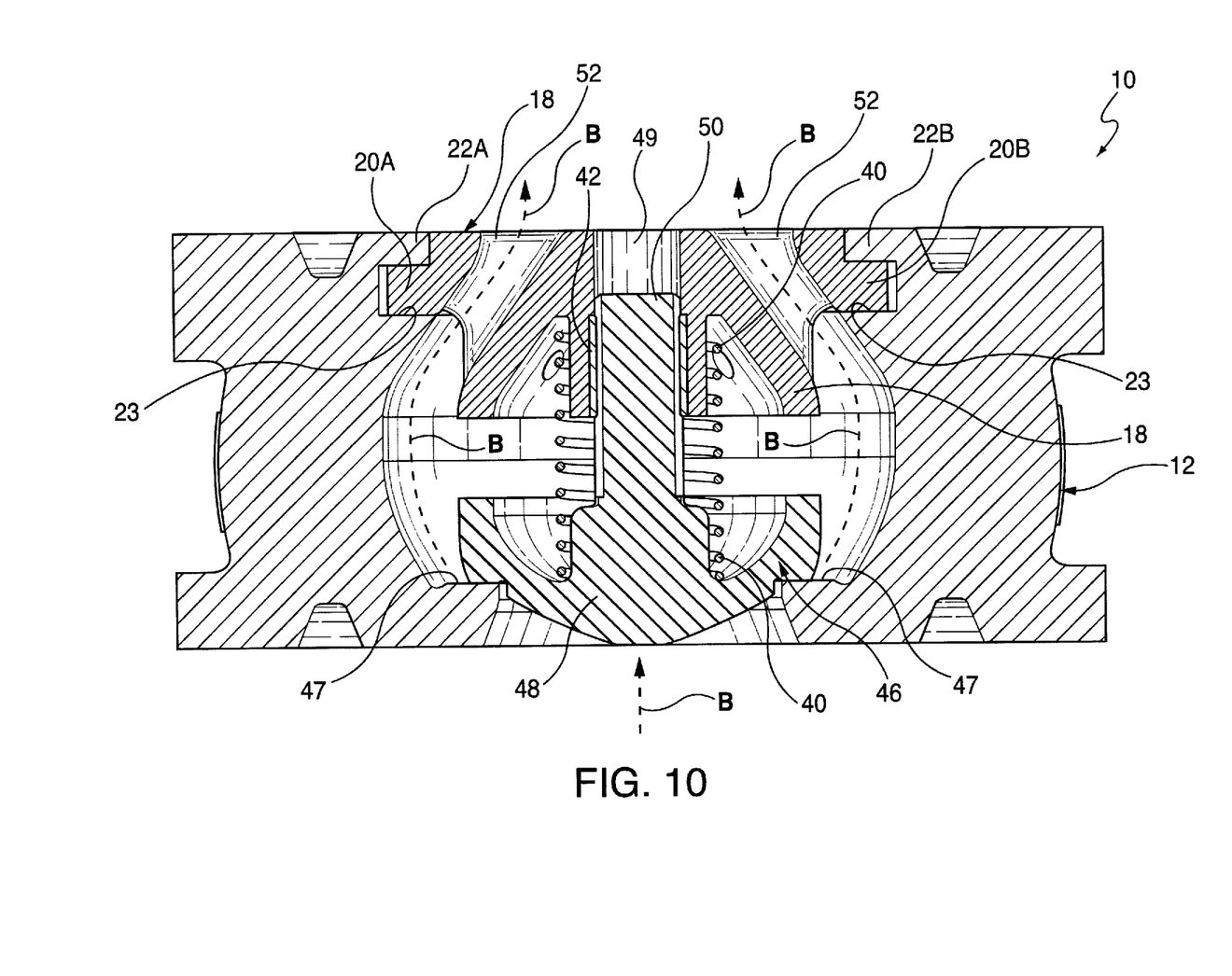
FIG. 10 is a cross-sectional view of the high pressure axial flow check valve of the present invention taken along line 10-10 of FIG. 9.

Guide 18 is held in place by the valve body itself, as seen best in FIG. 10. Since guide 18 is held in place by the overhanging lips 22A, 22B of the valve body 12 with its retainer screws 32 not being subjected to the same mechanical reaction forces caused by check valve operation, a substantially blowout-proof construction is provided for the guide 18, guide screws 26 and other internal structural elements of the check valve 10 of the present invention, which is not possible with check valves known to the state of the art, which depend on bolted, threaded, or flanged connections.

Figure 9:
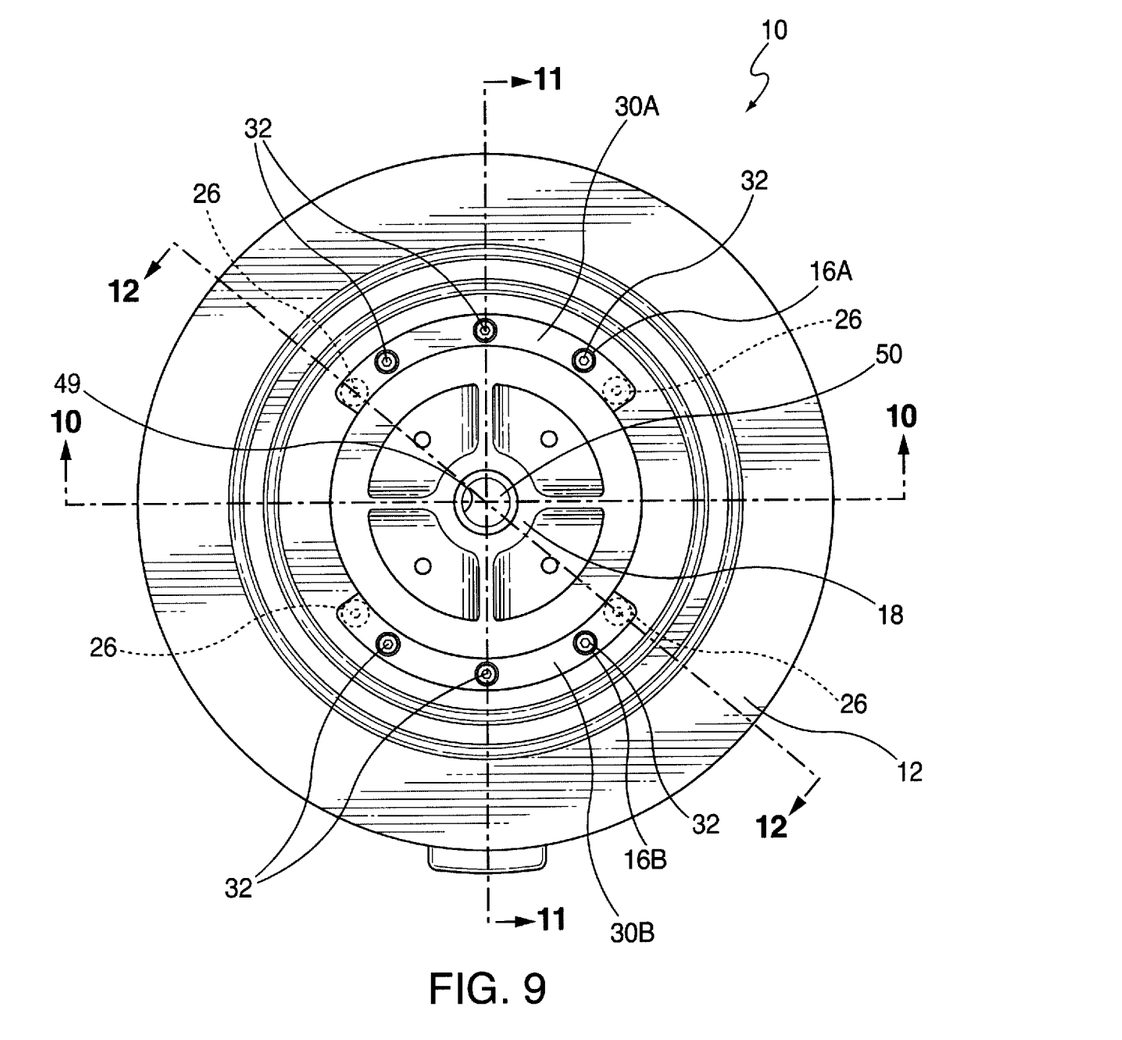
FIG. 9 is a plan view of the high pressure axial flow check valve of the present invention.

FIG. 9 is a plan view of the high pressure axial flow check valve 10 of the present invention following installation of retainers 30A, 30B and retainer screws 32.

FIG. 10 is a cross-sectional view of the high pressure axial flow check valve 10 of the present invention taken along line 10-10 of FIG. 9, which shows guide 18, as well as internal structures coil spring 40, bushing 42 and disc or poppet 46 mounted within the axial passageway of valve body 12. Arrows B shows the intended flow through the axial passageway when the valve is open and disc 46 is moved off its valve seat 47. FIG. 10 shows the check valve 10 in a closed position with the generally semispherical, disc-shaped head 48 of disc or poppet 46 being spring loaded by compression coil spring 40 against the annular or circular valve seat 47 of valve body 12.

Upon sufficient fluid flow at a predetermined minimum flow rate, the rounded head 48 of poppet 46 is raised off and moved inwardly of valve body 12 away from the circular or annular seat 47 of valve body 12 (not shown). This allows the flow of the fluid to enter the flow chamber of valve body 12 via the valve inlet defined by the valve seat 47 and follow via the internal flow path shown by arrows B to the preferably four (4) fluid outlets 52 in guide 18 on the opposite rear side of the valve 10 when a sufficient amount of force is applied by the fluid flow and disk head 48 is pushed rearwardly to compress the spring 40 and open the valve 10. When the flow rate drops below a predetermined minimum pressure, the force of spring 40 will bias the disc or poppet head 48 against the valve seat 47 to assume its closed position.

A cylindrical bushing 42 is mounted on guide 18 adjacent its central, cylindrical, axially extending through bore 49 so that bushing 42 is arranged coaxially with the through bore 49 of guide 18. Bushing 42 serves to support the stem or shaft 50 of disc 46 for axial reciprocal movement between its open and closed positions as dictated by the internal fluid flow in valve 10.

Figure 11:
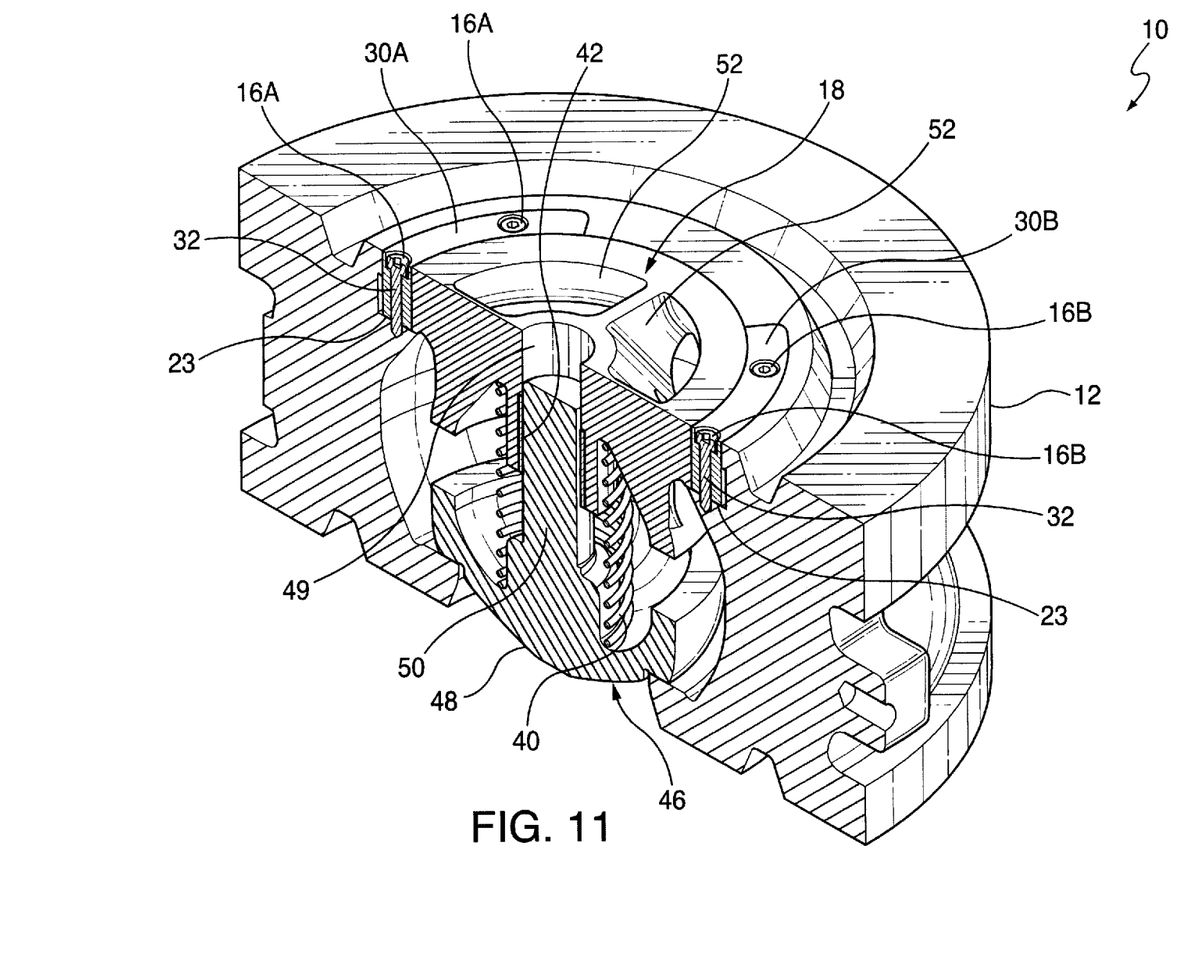
FIG. 11 is a cross-sectional view of the high pressure axial flow check valve of the present invention taken along line 11-11 of FIG. 9.

FIG. 11 is a cross-sectional view of the high pressure axial flow check valve 10 of the present invention taken along line 11-11 of FIG. 9, which shows two retainers 30A, 30B, and retainer screws 32 thus passing through retainer screw sockets 16A, 16B and threadably received in internal annular shelf 23 of valve body 12.

Figure 12:
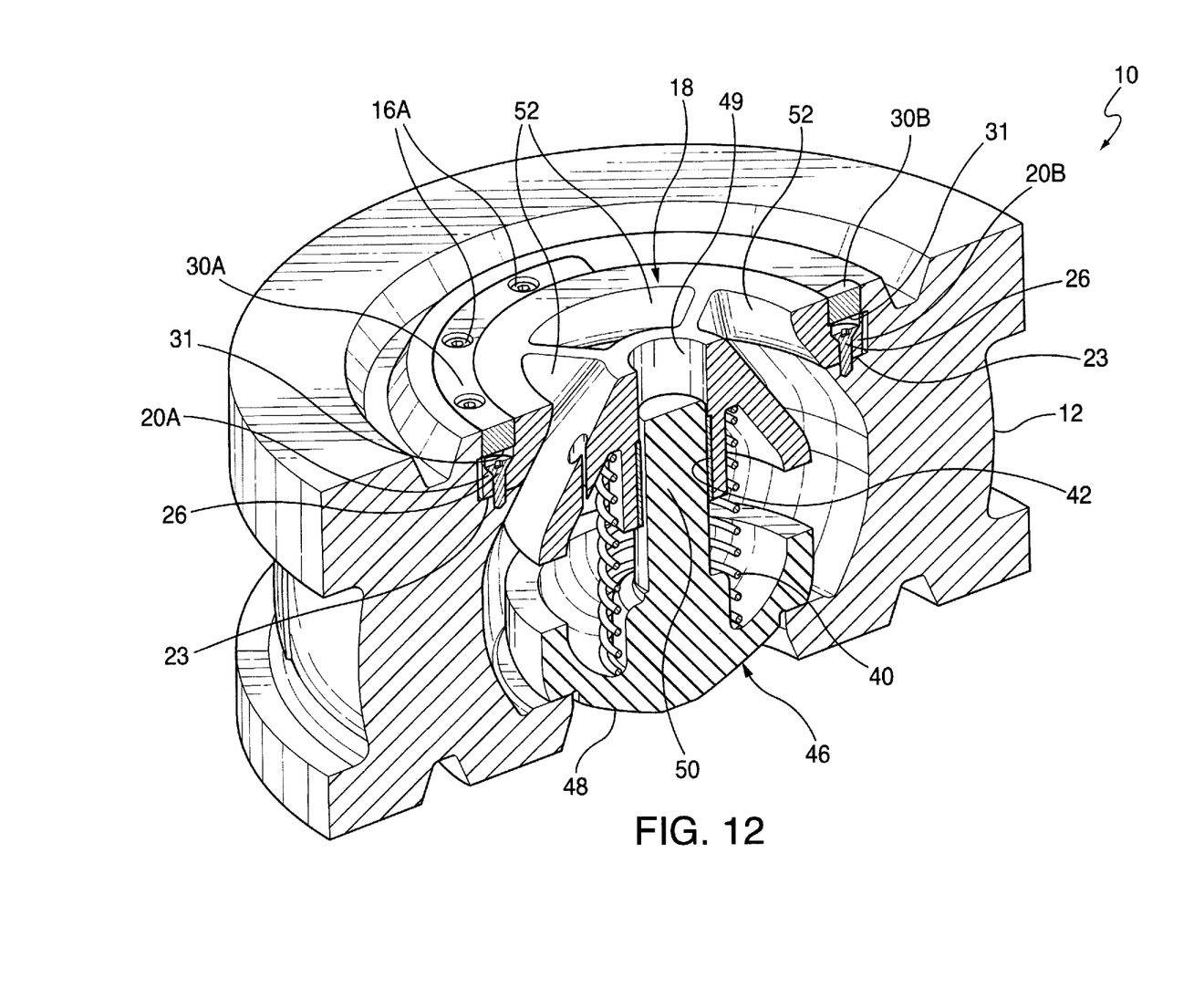
FIG. 12 is a cross-sectional view of the high pressure axial flow check valve of the present invention taken along line 12-12 of FIG. 9.

FIG. 12 is a cross-sectional view of the high pressure axial flow check valve 10 of the present invention taken along line 12-12 of FIG. 9, which shows the ends of arcuate retainers 30A, 30B overlying the guide screws 26 extending through the screw holes 24 adjacent to the ends of arcuate outer tabs 20A, 20B of guide 18 and threadably received in internal annular shelf 23 of valve body 12.

Figure 13:
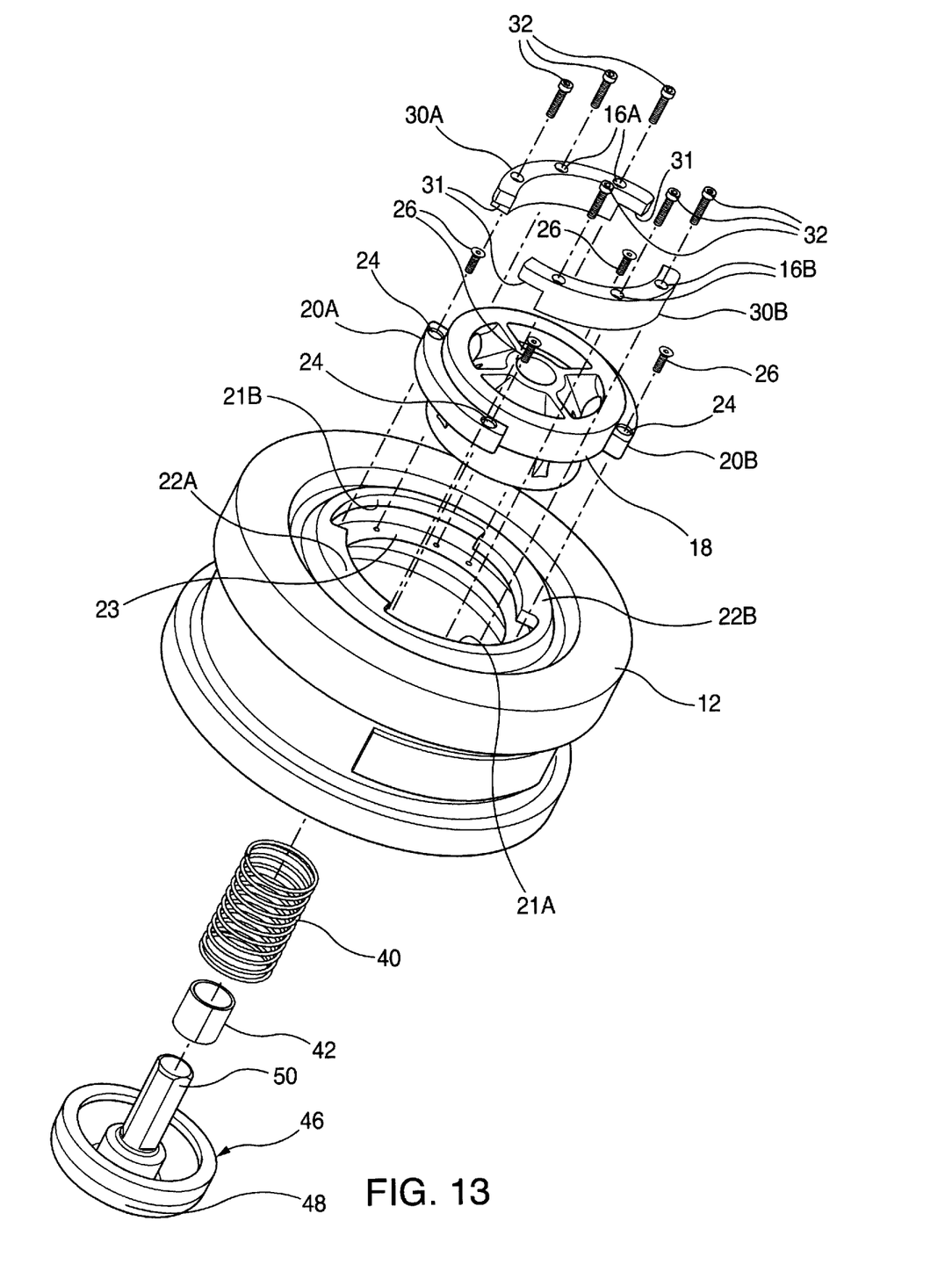
FIG. 13 is an exploded perspective view of the high pressure axial flow check valve of the present invention.

As seen best in FIG. 13, the arcuate retainers 30A, 30B each have opposite ends with a stepped surface 31 to define a cut-out in each end. The cutouts defined by stepped surfaces 31 allow the end portions of retainers 30A, 30B to rest upon and directly cover the screws 26 and screw holes 24 in outer tabs 20A, 20B as seen best in FIG. 9. At the same time, the lower central body portions of retainers 30A, 30B are disposed and sandwiched between the ends of the outer tabs 20A, 20B, as best seen in FIGS. 6 and 7, to provide a snug and rigid fit therebetween.

While only several embodiments of the present invention have been shown and described, it will be obvious to those skilled in the art that many modifications may be made to the present invention without departing from the spirit and scope thereof.

What is claimed is:

1. An axial flow check valve, comprising:
    a valve body having an overhanging lip;
    a guide having an outer tab being positionable underneath said overhanging lip of said valve body, said guide being able to be inserted, seated and rotatable 90° within said valve body;
    means for fastening said guide within said valve body after said guide has been inserted, seated and rotated 90° within said valve body;
    a retainer fixed on top of said guide after fastening said guide within said valve body; and,
    means for fixing said retainer on the top of said guide.

2. The axial flow check valve according to claim 1, wherein said guide has a plurality of said outer tabs that are positionable underneath a plurality of said overhanging lips of said valve body with a number of said plurality of outer tabs of said guide being equal to a number of said plurality of said overhanging lips of said valve body.

3. The axial flow check valve according to claim 1, wherein said valve body has two of said overhanging lips and said guide has two said outer tabs, each said outer tab of said guide being positionable underneath one said overhanging lip of said two said overhanging lips of said check valve.

4. The axial flow check valve according to claim 3, wherein said two overhanging lips are oppositely arranged on said valve body and said two outer tabs are oppositely arranged on said guide.

5. The axial flow check valve according to claim 4, wherein said overhanging lips and said outer tabs are generally arcuate.

6. The axial flow check valve according to claim 3, wherein said valve body has a pair of spaced-apart, arcuate cut-outs disposed between said overhanging lips which are configured and dimensioned to allow said two outer tabs of said guide to pass therethrough into said valve body.

7. The axial flow check valve according to claim 6, wherein said valve body has an annular ledge disposed inwardly of, and below said overhanging lips on which said outer tabs of said guide may be seated when said guide is inserted within said valve body and on which said guide may be rotated 90° within said valve body.

8. The axial flow check valve according to claim 7, wherein
said means for fixing said retainer on the top of said guide includes screws received through screw holes in said retainer and threadably received and fixed in said annular ledge of said valve body.

9. The axial flow check valve according to claim 1, wherein there are two said retainers on top of said guide are positioned opposite one another.

10. The axial flow check valve according to claim 9, wherein said means for fixing said retainers comprise a plurality of threaded fasteners and wherein each of said retainers has a plurality of spaced-apart threaded holes in which said fasteners are threadable therethrough into threaded holes in said valve body.

11. The axial flow check valve according to claim 10, wherein said fasteners comprise screws.

12. The axial flow check valve according to claim 1, wherein said means for fastening said guide within said valve body includes a plurality of fasteners inserted through aligned holes in said guide and said valve body.

13. The axial flow check valve according to claim 12, wherein said fasteners comprise screws.

14. The axial flow check valve according to claim 1, wherein said means for fixing said retainer on the top of said guide includes a plurality of fasteners inserted through aligned holes in said retainer and said valve body.

15. The axial flow check valve according to claim 14, wherein said fasteners comprise screws.

16. The axial flow check valve according to claim 1, wherein said valve body and said guide are generally cylindrical and they together define an axial flow path therethrough having a flow inlet and a flow outlet.

17. The axial flow check valve according to claim 1, wherein said valve body is generally cylindrical and defines a central axial passageway and said guide and said valve body cooperatively define together a valve inlet and valve outlet and a fluid flow path through said axial passageway disposed between said valve inlet and valve outlet.

18. The axial flow check valve according to claim 17, wherein said check valve additionally includes a valve seat on said valve body, and a spring-loaded poppet mounted in said guide and valve body for reciprocal movement between an open and close position relative to said valve seat.

* * * * *